(12) United States Patent
Yum et al.

(10) Patent No.: US 8,779,894 B2
(45) Date of Patent: Jul. 15, 2014

(54) METHOD FOR SETTING REMOTE CONTROLLER AND REMOTE CONTROLLER APPLYING THE SAME

(75) Inventors: Duck-ki Yum, Seoul (KR); Baik-hee Han, Yongin-si (KR); Cheon-seong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 12/752,804

(22) Filed: Apr. 1, 2010

(65) Prior Publication Data

US 2011/0068897 A1  Mar. 24, 2011

(30) Foreign Application Priority Data

Sep. 18, 2009  (KR) .................. 10-2009-0088570

(51) Int. Cl.
*G08B 21/00* (2006.01)
*H04N 5/445* (2011.01)

(52) U.S. Cl.
CPC ............................. *H04N 5/44543* (2013.01)
USPC ..... 340/5.83; 340/5.53; 340/12.23; 340/4.11; 348/563; 348/734; 382/124

(58) Field of Classification Search
CPC .......... H04N 21/4415; H04N 21/4532; H04N 5/4403; H04N 21/42204; H04N 5/44543
USPC ............ 340/5.53, 5.83, 12.23, 4.11; 348/563, 348/734; 382/124
See application file for complete search history.

(56) References Cited

U.S. PATENT DOCUMENTS

| | | | |
|---|---|---|---|
| 5,990,803 A * | 11/1999 | Park ............................. | 340/5.53 |
| 6,130,726 A | 10/2000 | Darbee et al. | |
| 6,256,019 B1 * | 7/2001 | Allport ........................ | 345/169 |
| 2006/0250213 A1 * | 11/2006 | Cain et al. .................... | 340/5.52 |
| 2008/0052626 A1 * | 2/2008 | Han .............................. | 715/721 |
| 2008/0084389 A1 | 4/2008 | Mac | |
| 2009/0138907 A1 | 5/2009 | Wiser et al. | |
| 2009/0146779 A1 * | 6/2009 | Kumar et al. ................ | 340/5.31 |
| 2009/0251619 A1 | 10/2009 | Seidel et al. | |

FOREIGN PATENT DOCUMENTS

| | | |
|---|---|---|
| JP | 2001-028790 A | 1/2001 |
| JP | 2005-033657 A | 2/2005 |
| WO | 00/58934 A1 | 10/2000 |

OTHER PUBLICATIONS

Communication issued on Jun. 9, 2010 in counterpart European Application No. 10157890.4.
Communication, dated Jul. 11, 2013, issued by the European Patent Office in counterpart European Application No. 10 157 890.4.
Communication, dated Feb. 25, 2014, issued by the Japanese Patent Office in counterpart Japanese Application No. 2010-175988.

* cited by examiner

*Primary Examiner* — Nabil Syed
*Assistant Examiner* — Mark Rushing
(74) *Attorney, Agent, or Firm* — Sughrue Mion, PLLC

(57) ABSTRACT

A method for setting a remote controller which controls a remote controller is provided. The method includes identifying a user by fingerprint recognition, and setting the remote controller to provide functions corresponding to the identified user.

19 Claims, 8 Drawing Sheets

METHOD FOR SETTING REMOTE CONTROLLER AND REMOTE CONTROLLER APPLYING THE SAME

CROSS-REFERENCE TO RELATED APPLICATION

This application claims priority from Korean Patent Application No. 10-2009-0088570, filed in the Korean Intellectual Property Office on Sep. 18, 2009, the disclosure of which is incorporated herein by reference in its entirety.

BACKGROUND

1. Field

Apparatuses and methods consistent with exemplary embodiments relate to setting a remote controller, and more particularly, to setting a remote controller to identify users by their fingerprints.

2. Description of the Related Art

A remote controller may provide various functions with a use of a display screen with a touch screen function.

A related art remote controller may receive a user input by manipulating fixed mechanical buttons. Alternatively, a related art remote controller having a touch screen may provide various buttons and menus. Accordingly, the user may input various commands using the remote controller with a touch screen.

However, it is difficult for the user to know and use all of the functions of the remote controller which are set at the time of the remote controller production. Furthermore, as the functions of the remote controller became more complicated, a method to allow the user to make use of a desired function more easily is required.

SUMMARY

Exemplary embodiments may address at least the above problems and/or disadvantages and other disadvantages not described above. Also, exemplary embodiments are not required to overcome the disadvantages described above, and an exemplary embodiment may not overcome any of the problems described above.

Exemplary embodiments provide a method for setting a remote controller to identify a user using his or her fingerprints and to set the remote controller to provide corresponding functions to an identified user, and a remote controller using the same.

According to an aspect of an exemplary embodiment, there is provided a method for setting a remote controller which controls an electronic device, the method including identifying a user through fingerprint recognition and setting the remote controller to provide functions corresponding to the identified user.

The setting may set the remote controller to display a graphical user interface (GUI) for providing functions corresponding to the identified user on a screen.

The setting may set a size of at least one button displayed on the remote controller screen according to the identified user.

The setting may set the remote controller to display buttons for performing functions corresponding to the identified user on the remote controller screen.

The buttons may be selected by a user from among buttons for performing functions provided by the remote controller.

The setting may set the remote controller to display a broadcast channel list corresponding to the identified user on the remote controller screen.

At least one of a preferred channel option and a channel lock option for each channel may be selected in the broadcast channel list.

The method may further include transmitting, if the broadcast channel list is changed, information regarding the changed broadcast channel list to the electronic device.

According to an aspect of another exemplary embodiment, there is provided a remote controller to control an electronic device, the remote controller including a display unit to display a GUI, a fingerprint recognition unit to identify a user through fingerprint recognition, and a control unit to cause functions corresponding to the identified user to be provided.

The control unit may set the display unit to display a GUI for providing functions corresponding to the identified user on a screen.

The control unit may set a size of at least one button displayed on the remote controller screen according to the identified user.

The control unit may set the display unit to display buttons for performing functions corresponding to the identified user on a screen.

The buttons may be selected by a user from among buttons for performing functions provided by the remote controller.

The control unit may set the display unit to display a broadcast channel list corresponding to the identified user on a screen.

The broadcast channel list may allow a user to select at least one of a preferred channel option and a channel lock option for each channel.

The control unit may control the remote controller to transmit, if the broadcast channel list is changed, information regarding the changed broadcast channel list to the electronic device.

BRIEF DESCRIPTION OF THE DRAWINGS

The above and other aspects will become more apparent by describing certain exemplary embodiments with reference to the accompanying drawings, in which.

DETAILED DESCRIPTION

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 1:
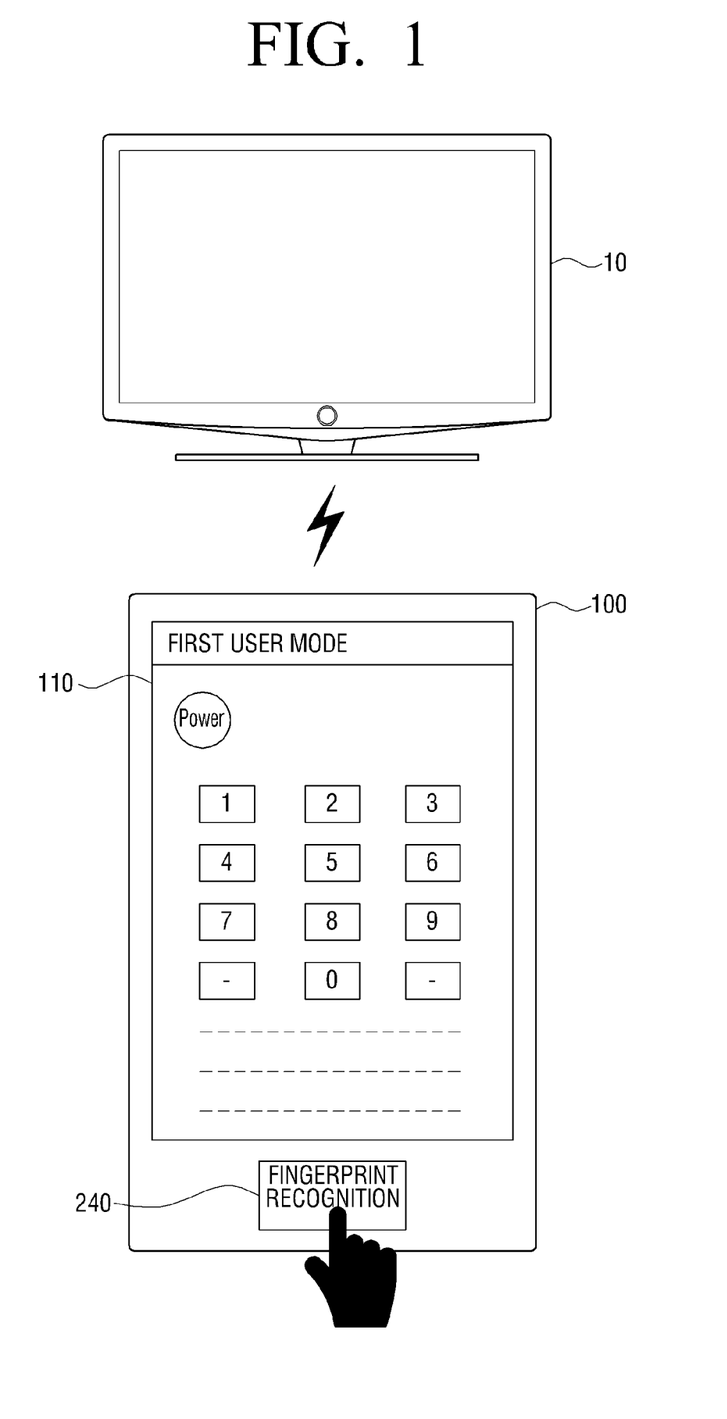
FIG. 1 is a view illustrating a television (TV) and a remote controller according to an exemplary embodiment.

FIG. 1 is a view illustrating a TV 10 and a remote controller 100 according to an exemplary embodiment. As illustrated in FIG. 1, the TV 10 is controlled by the remote controller 100.

As illustrated in FIG. 1, the remote controller 100 includes a display screen 110. That is, in an exemplary embodiment, the remote controller 100 has buttons displayed on a display screen 110 instead of the mechanical buttons.

The display screen 110 includes a touch screen function. Accordingly, a user may input a desired command by touching a button corresponding to a desired function selected from the buttons displayed on the display screen 110.

The remote controller 100 includes a fingerprint recognition unit 240. The fingerprint recognition unit 240 senses fingerprints of a user to identify the user. The remote controller 100 displays a remote controller button corresponding to the identified user on the display screen 110. As illustrated in FIG. 1, the remote controller 100 identifies that a current user is the first user through fingerprint recognition by the fingerprint recognition unit 240 and provides the remote controller screen in the first user mode.

As such, the remote controller 100 identifies a user through the fingerprint recognition and displays a remoter controller screen corresponding to the identified user on the display screen 110.

Figure 2:
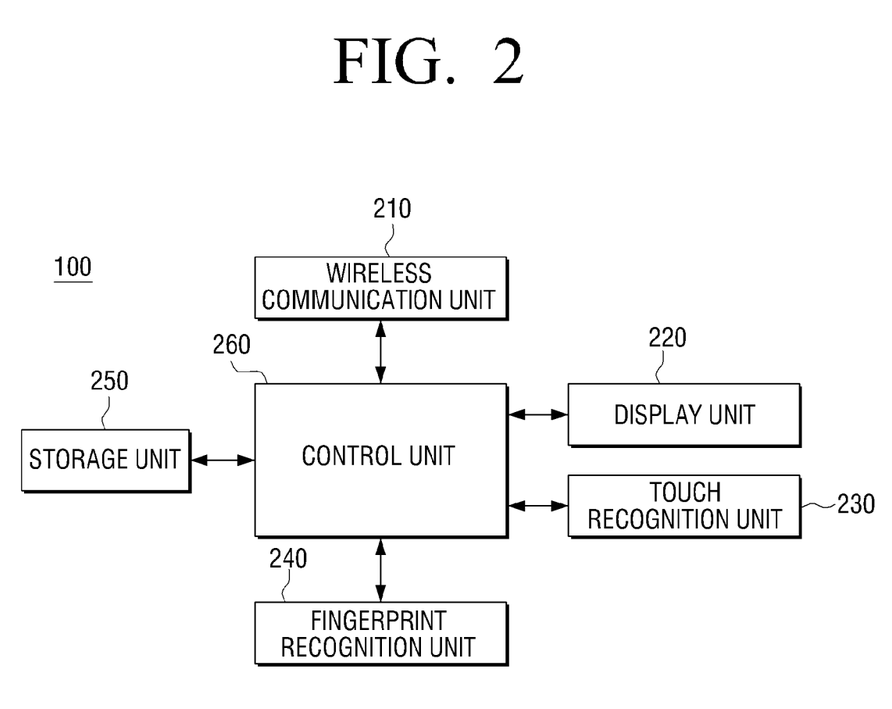
FIG. 2 is a block diagram illustrating a detailed structure of a remote controller according to an exemplary embodiment.

FIG. 2 is a block diagram illustrating a detailed structure of a remote controller according to an exemplary embodiment. As illustrated in FIG. 2, the remote controller 100 includes a wireless communication unit 210, a display unit 220, a touch recognition unit 230, a fingerprint recognition unit 240, a storage unit 250, and a control unit 260.

The wireless communication unit 210 transmits a command input by a user to the TV 10. The wireless communication unit 210 is communicably connected with the TV 10 through wireless communication using a radio frequency (RF) signal. For instance, the wireless communication unit 210 may communicate with the TV 10 using ZigBee or Bluetooth communication standards.

The display unit 220 displays a graphic user interface (GUI) including various buttons to receive a user's command on a screen 110. Specifically, the display unit 220 displays a remote controller screen including a GUI for providing a function corresponding to a user identified by using the fingerprint recognition unit 240. The display unit 220 displays the buttons to input a channel number and other commands on a screen. The detailed structure of the GUI is explained below with reference to FIGS. 4 to 8.

The touch recognition unit 230 receives a user's touch manipulation. Specifically, the touch recognition unit 230 senses a user's touch manipulation on a display screen 110. By doing so, the touch recognition unit 230 performs a touch screen function.

The fingerprint recognition unit 240 identifies a user by sensing the user's fingerprints using the fingerprint recognition technology. The fingerprint recognition technology, which is a part of biometric recognition, is used to identify the user by extracting fingerprinting information which is different for each individual user. Since fingerprints do not change as long as dermis is not damaged, the fingerprint recognition is used to identify individuals.

The fingerprint recognition unit 240 identifies a user using the sensed fingerprinting information and transmits the identified user information to the control unit 260.

The storage unit 250 stores programs or software instructions to operate a remote controller and graphic data regarding a GUI displayed on the screen 110 of the remote controller 100. In addition, the storage unit 250 stores user information. The user information includes information regarding the user's fingerprinting and the user's remote controller setting. The information regarding the user's remote controller setting includes at least one of a size of the buttons, a hot-key setting, and a channel list. The hot-key refers to a group of keys preferred by a user and selected from the buttons provided by the remote controller 100. The hot-key is displayed in a specific area of the screen 110 of the remote controller 100.

The control unit 260 controls operation of the remote controller 100 according to a user manipulation. The control unit 260 generates a control signal corresponding to a command to control the TV 10 input by a user and transmits the signal to the TV 10 through the wireless communication unit 210.

The control unit 260 sets the display unit 220 so that a GUI for providing a function corresponding to a user identified by using the fingerprint recognition unit 240 is displayed on the screen 110.

Specifically, the control unit 260 identifies a user by referring to the user information stored in the storage unit 250 based on the fingerprints sensed by the fingerprint recognition unit 240. The control unit 260 controls the display unit 220 so that a GUI for providing a function corresponding to the user is displayed on the screen 110.

Specifically, the control unit 260 sets the size of at least one button displayed on the screen of the remote controller 100 according to the identified user. That is, the control unit 260 controls the display unit 220 to display the buttons in a set size by referring to the button size information corresponding to the identified user.

Since information regarding the size of buttons is preset for each user, the control unit 260 may automatically set buttons to be displayed in an appropriate size for the fingers of each user. The button size of the remote controller 100 may vary according to a user's preference. A user with poor eye sight or big hands may prefer bigger buttons. Accordingly, a user may set the remote controller 100 to display the buttons of a preferred size after the user is identified through fingerprint recognition.

The control unit 260 may set the display unit 220 to display the buttons of functions corresponding to a identified user on a specific area of the screen. Specifically, the control unit 260 controls the display unit 220 to display the buttons selected by the user from the function buttons, which can be provided by the remote controller 100, on a specific area, such as, a hot-key area.

In more detail, the control unit 260 controls the display unit 220 so that the buttons a user sets as the hot-keys are displayed in a hot-key display area, using the hot-key setting information of the user identified through the fingerprint recognition unit 240.

Accordingly, the buttons of frequently used functions may be displayed in the separate area for the user to use.

The control unit 260 sets the display unit 220 to display a broadcast channel list corresponding to a identified user on a screen 110. The broadcast channel list is a list of broadcast channels including broadcast channel numbers and broadcast channel names. The control unit 260 may receive information regarding a broadcast channel list from the TV 10 through the wireless communication unit 210. In addition, the control unit 260 may generate a channel list using the information regarding a channel list for each user stored in the storage unit 250 and display it on the screen 110.

The control unit 260 may set at least one of a preferred channel option and a channel lock option for each channel included in a broadcast channel list according to a user manipulation.

The preferred channel option sets a specific channel as the channel preferred by a user. The control unit 260 may set the preferred channels to be displayed on the top of the channel list or to be displayed separately.

The channel lock option sets a specific channel not to be used by a user. The control unit 260 may set the channel-locked channels not to be selected from the channel list or not to be displayed on the channel list.

The control unit 260 may change the items or options of a broadcast channel list according to a user manipulation. If a broadcast channel list is changed by a user, the control unit 260 transmits the information regarding the changed broadcast channel list to the TV 10. In addition, if the broadcast channel list is changed by a user, the control unit 260 controls the storage unit 250 to store the information regarding the changed broadcast channel list.

As such, under the control of the control unit 260, a channel list selected and set by a user is displayed on the screen 110. Accordingly, the remote controller 100 may automatically display a user's desired channel list on the screen through the fingerprint recognition.

As such, the remote controller 100 may provide a GUI of various functions to a user through the fingerprint recognition. Accordingly, the user may use the remote controller more easily and intuitively through the fingerprint recognition.

Figure 3:
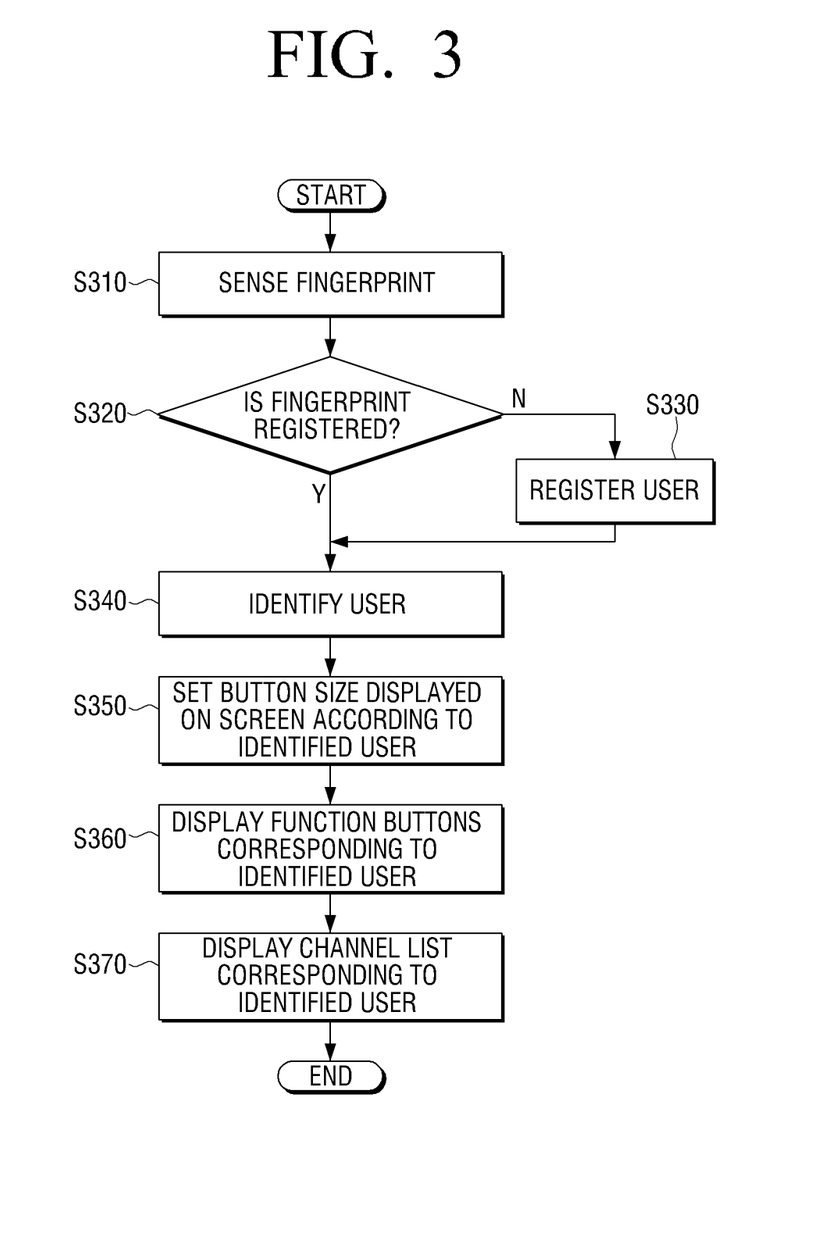
FIG. 3 is a flowchart provided to explain a method for setting a remote controller according to an exemplary embodiment.

Hereinbelow, a method for setting the remote controller 100 is explained in detail with reference to FIG. 3. FIG. 3 is a flowchart provided to explain a method for setting a remote controller according to an exemplary embodiment.

The remote controller 100 senses the user's fingerprints using the fingerprint recognition technology (S310) and identifies the user based on the sensed fingerprint information.

Specifically, the remote controller 100 determines whether the sensed fingerprints are registered fingerprints by comparing the sensed fingerprints with the fingerprints for the users stored in the storage unit 250 (S320). If the sensed fingerprints are the fingerprints registered (S320-Y), the remote controller 100 identifies the user by comparing the fingerprint information stored in the storage unit 250 with the sensed fingerprint information (S340).

However, if the sensed fingerprints are not registered (S320-N), the remote controller 100 registers the user by receiving user information from the user (S330). The remote controller 100 also receives the fingerprint information of the user when registering the user. The remote controller 100 identifies the user using the user information registered in the remote controller 100 (S340).

Subsequently, the remote controller 100 displays a GUI for providing a function corresponding to the user identified by using the fingerprint recognition unit 240.

Specifically, the remote controller 100 sets the size of at least one button displayed on the screen 110 according to the identified user (S350). That is, the remote controller 100 displays the buttons in a set sized by referring to the button size information corresponding to the identified user. The button size information is information regarding the size of buttons set according to each user, and is stored in the storage unit 250 as a part of the user information.

Since information regarding the size of buttons is preset for each user, the remote controller 100 may automatically set buttons to be displayed in an appropriate size for the fingers of each user. The button size of the remote controller 100 may vary according to a user's preference. A user with poor eye sight or big hands may prefer bigger buttons. Accordingly, a user may set the remote controller 100 to display the buttons in a preferred size after the user is identified through the fingerprint recognition.

The remote controller 100 displays buttons of functions corresponding to a identified user in a specific area of the screen (S360). Specifically, the remote controller 100 displays the buttons selected by the user from the function buttons provided by the remote controller 100 in a specific area, such as, a hot-key area.

For instance, the remote controller 100 displays the buttons corresponding to the hot-keys set by a user in the hot-key area by using the hot-key setting information of a user identified by the fingerprint recognition unit 240.

Accordingly, the buttons of frequently used functions may be displayed in the separate area for the user to use.

The remote controller 100 displays a broadcast channel list corresponding to a identified user on a screen (S370). The broadcast channel list is a list of broadcast channels including broadcast channel numbers and broadcast channel names. The remote controller 100 may receive information regarding a broadcast channel list from the TV 10 through the wireless communication unit 210. In addition, the remote controller 100 may generate a channel list using the information regarding a channel list for each user stored in the storage unit 250 and display it on the screen.

The remote controller 100 may set at least one of a preferred channel option and a channel lock option for each channel included in a broadcast channel list according to a user manipulation.

The preferred channel option is to set a specific channel as the channel preferred by a user. The remote controller 100 may set the preferred channels to be displayed on the top of the channel list or to be displayed separately.

The channel lock option is to set a specific channel not to be used by a user. The remote controller 100 may set the channel-locked channels not to be selected from the channel list or not to be displayed on the channel list.

The remote controller 100 may change the items or options of a broadcast channel list according to a user manipulation. If a broadcast channel list is changed by a user, the remote controller 100 transmits the information regarding the changed broadcast channel list to the TV 10. In addition, if the broadcast channel list is changed by a user, the remote controller 100 controls the storage unit 250 to store the information regarding the changed broadcast channel list.

As such, under the control of the remote controller 100, a channel list selected and set by a user is displayed on the screen 110. Accordingly, the remote controller 100 may automatically display a user's desired channel list on the screen 110 through the fingerprint recognition.

As such, the remote controller 100 may provide a GUI of various functions to a user through the fingerprint recognition. Accordingly, the user may use the remote controller more easily and intuitively through the fingerprint recognition.

Figure 4:
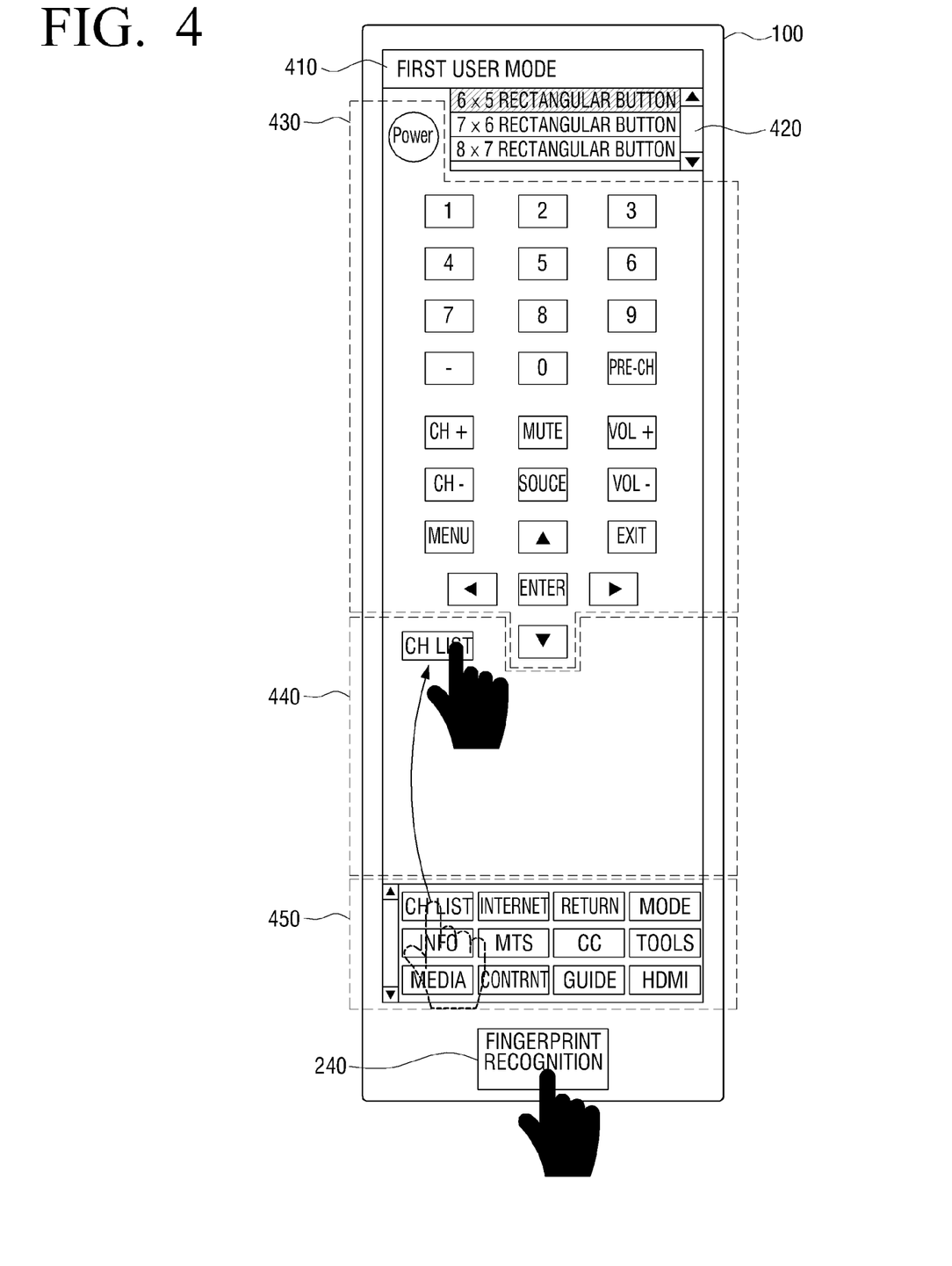
FIG. 4 is a view illustrating a remote controller when a current user is identified as the first user through fingerprint recognition according to an exemplary embodiment.

Hereinbelow, the screen 110 of the remote controller 100 for each user is explained with reference to FIGS. 4 to 8. FIG. 4 is a view illustrating a remote controller 100 when the first user is identified through the fingerprint recognition according to an exemplary embodiment.

As illustrated in FIG. 4, the display screen 110 of the remote controller 100 includes a user display area 410, a button size menu area 420, a button display area 430, a hot-key display area 440, and a hot-key selection area 450.

The user display area 410 is an area in which the information of a user identified by the fingerprint recognition unit 240 is displayed. FIG. 4 illustrates the remote controller when the user of the remote controller 100 is identified as the first user by the fingerprint recognition unit 240. Accordingly, "the first user mode" is displayed in the user display area 410 of FIG. 4.

The button size menu area 420 is an area in which a menu for setting a button size is displayed. The remote controller 100 in FIG. 4 displays rectangular buttons with the size of 6×5 for the first user. Accordingly, '6×5 rectangular button' is highlighted in the button size menu area 420 of the remote controller 100 in FIG. 4.

The button display area 430 is an area in which the buttons for the operation of the remote controller 100 are displayed. The buttons displayed in the button display area 430 include at least one of a power button, a number button, a direction button, a channel button, a volume button, and other appropriate buttons.

The remote controller 100 displays the buttons in a set button size. That is, the remote controller 100 in FIG. 4 displays the rectangular buttons in the button display area 430 in the size of 6×5.

The hot-key display area 440 is an area in which a hot-key selected by a user is displayed. The remote controller 100 displays the keys frequently used by the user in a separate area which is the hot-key display area 440.

The hot-key selection area 450 is an area in which the buttons to become the hot-keys are displayed. As illustrated in FIG. 4, various buttons are displayed in the hot-key selection area 450. The buttons displayed in the hot-key selection area 450 are the buttons of functions which can be provided by the remote controller 100.

The remote controller 100 displays the buttons selected by a user from the buttons displayed in the hot-key selection area 450 in the hot-key display area 440. For instance, if a button displayed in the hot-key selection area 450 is dragged and dropped in the hot-key display area 440 by a user, this button is set as a hot-key.

FIG. 4 illustrates that a user drags and drops a "CH LIST" button from the hot-key selection area 450 to the hot-key display area 440. Accordingly, the remote controller 100 sets the "CH LIST" button as a hot-key and displays the "CH LIST" button in the hot-key display area 440.

As such, a user may set a desired button as a hot-key, and the remote controller 100 stores information regarding the hot-key set by the user in the storage unit 250 as the hot-key setting information. Accordingly, if the first user uses the remoter controller 100 later and is identified through the fingerprint recognition, the remote controller 100 composes the hot-key area 440 where the "CH LIST" button is set as a hot-key, as illustrated in FIG. 4.

Figure 5:
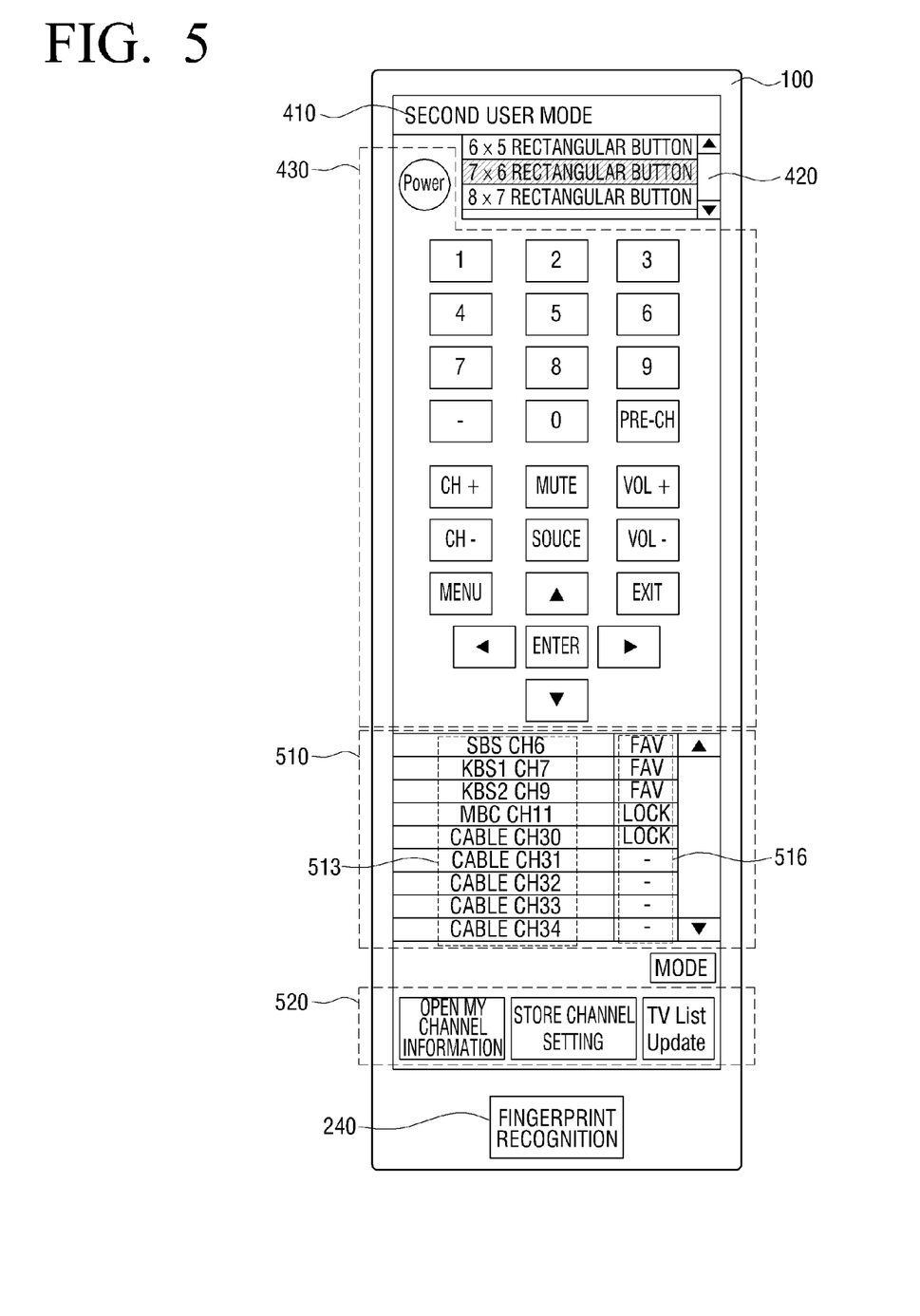
FIG. 5 is a view illustrating a remote controller when a current user is identified as the second user through fingerprint recognition according to an exemplary embodiment.

FIG. 5 is a view illustrating a remote controller when the second user is identified through the fingerprint recognition according to an exemplary embodiment. Since the remote controller illustrated in FIG. 5 is similar to that illustrated in FIG. 4, only the differences between the two are explained.

As illustrated in FIG. 5, the display screen 110 of the remote controller 100 includes the user display area 410, the button size menu area 420, the button display area 430, a channel list display area 510, and a channel list-related button display area 520. That is, in FIG. 5, the channel list display area 510 and the channel list-related button display area 520, which may vary according to a user's setting, are displayed instead of the hot-key display area 440 and the display area for hot-key 450.

The user display area 410 displays the information of a user identified through the fingerprint recognition unit 240. FIG. 5 illustrates the remote controller 100 when the second user is identified through the fingerprint recognition. Accordingly, "the second user mode" is displayed in the user display area 410 in FIG. 5. Therefore, the GUI displayed on the screen 110 of the remote controller 100 corresponding to the second user in FIG. 5 is different from the GUI displayed on the screen 110 of the remote controller 100 in FIG. 4. As such, the remote controller 100 displays different GUIs according to the user identified through the fingerprint recognition.

The button size menu area 420 is an area in which a menu to set a button size is displayed. The remote controller 100 in FIG. 5 displays rectangular buttons with the size of 7×6 for the second user. Accordingly, '7×6 rectangular button' is highlighted in the button size menu area 420 of the remote controller 100 in FIG. 5.

The button display menu 430 is an area to display the buttons for the operation of the remote controller 100. The remote controller 100 displays the buttons in a set button size. That is, the remote controller 100 in FIG. 5 displays the rectangular buttons in the button display area 430 in the size of 7×6. Accordingly, the buttons displayed in the button display area 430 in FIG. 5 are bigger than the buttons displayed in FIG. 4.

As such, the remote controller 100 may change the size of the displayed buttons according to a user. Therefore, the user may set the size of buttons of the remote controller 100 so that the buttons are displayed in a desired size.

The channel list display area 510 is an area in which a broadcast channel list corresponding to a user is displayed. A broadcast channel name and number display area 513 and a channel option display area 516 are displayed in the broadcast channel list. A broadcast channel name and its broadcast channel number are displayed in the broadcast channel name and number display area 513.

The channel option display area 516 is an area where options for each channel are displayed. As illustrated in FIG. 5, channel options include "FAV" and "LOCK". "FAV" represents an option for favorite channels and "LOCK" represents a channel lock option. In FIG. 5, channels 6, 7, and 9 are selected as favorite channels, and channels 11 and 30 are channels which are set to be locked.

The channel list-related button display area 520 is an area in which buttons corresponding to functions related to a channel list are displayed.

As such, the remote controller 100 may display a channel list screen according to a user. Therefore, the user may set and select a channel list easily.

Figure 6:
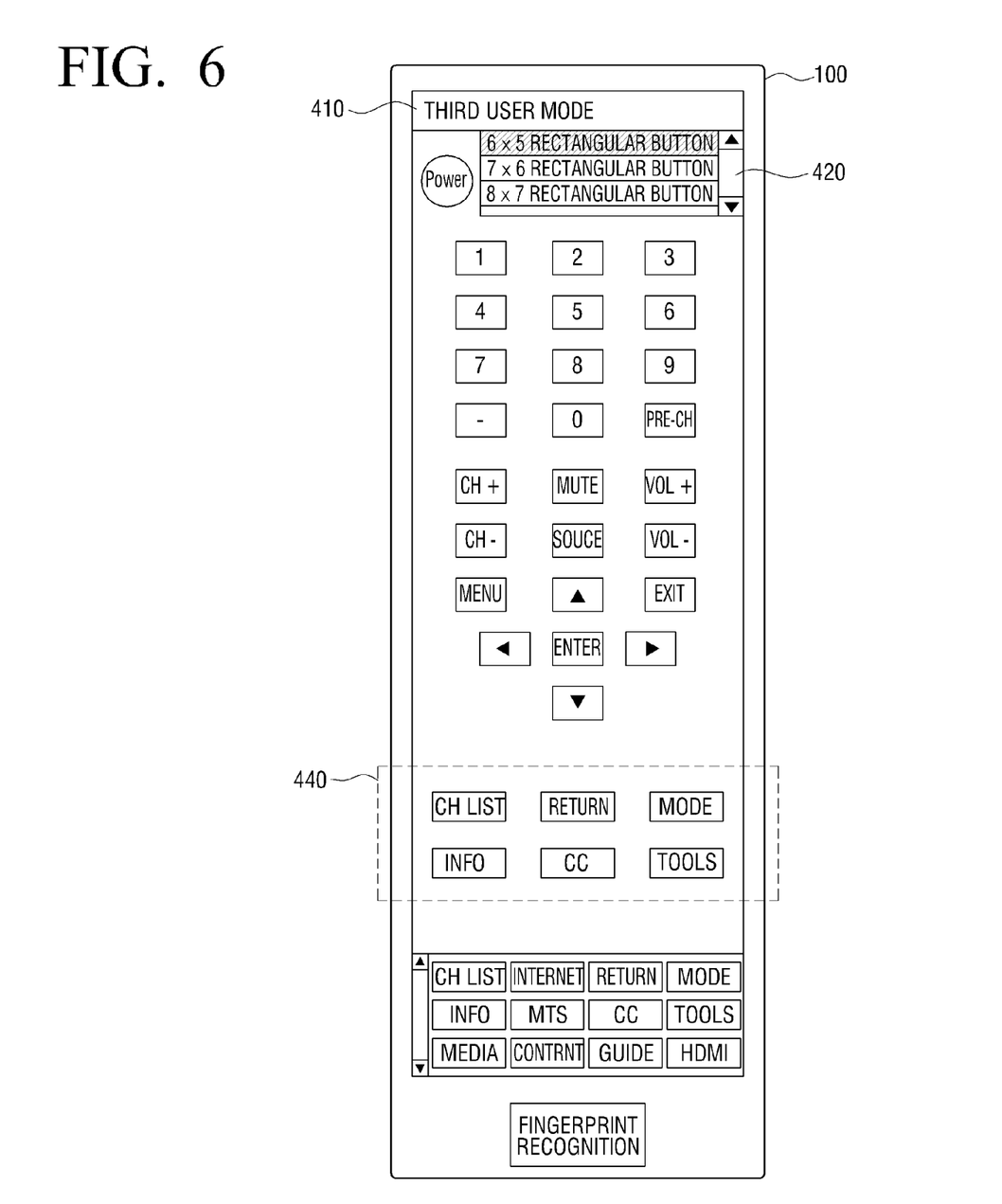
FIG. 6 is a view illustrating a remote controller when a current user is identified as the third user through fingerprint recognition according to an exemplary embodiment.
Figure 7:
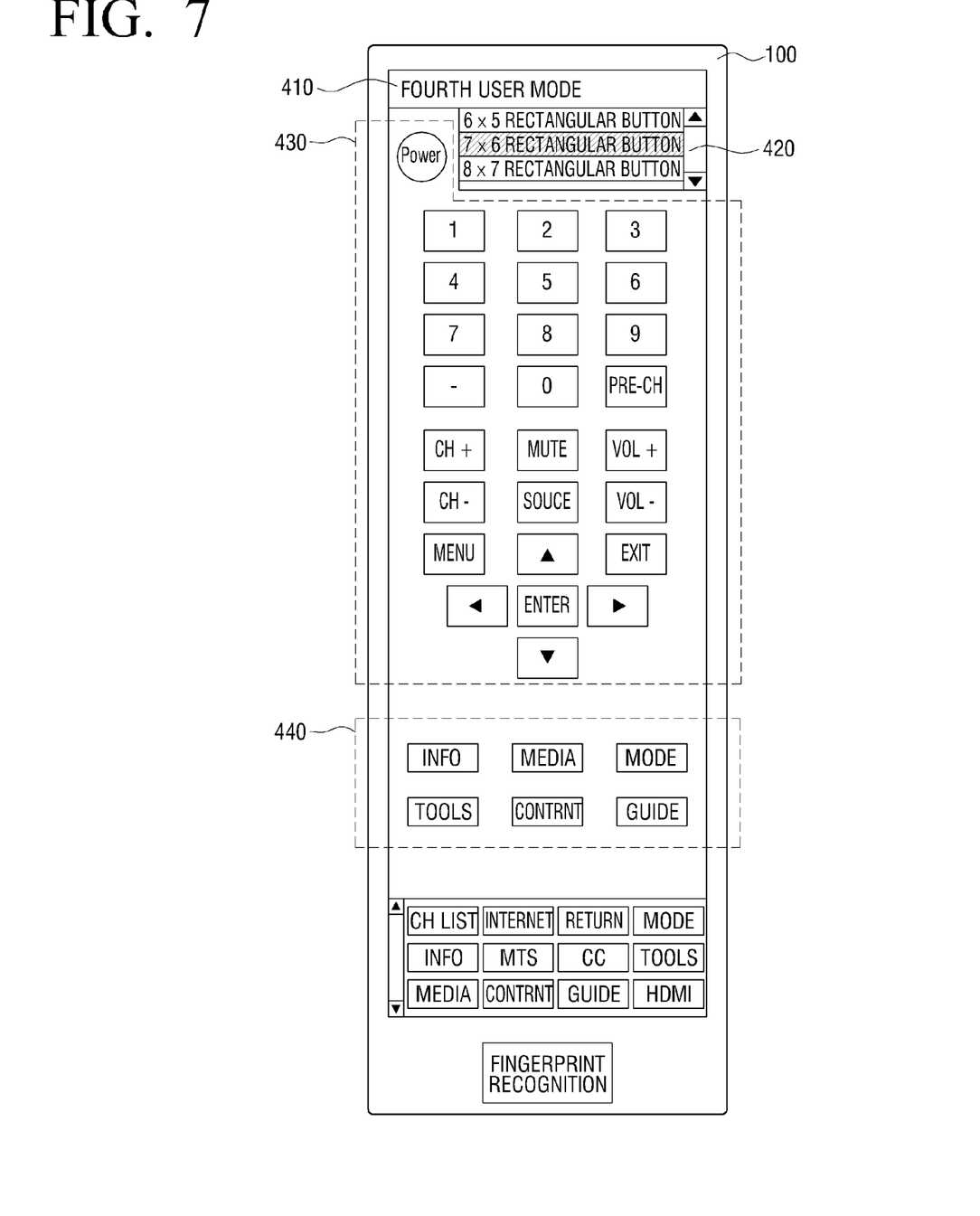
FIG. 7 is a view illustrating a remote controller when a current user is identified as the fourth user through fingerprint recognition according to an exemplary embodiment.

FIG. 6 is a view illustrating a remote controller when the third user is identified through the fingerprint recognition according to an exemplary embodiment, and FIG. 7 is a view illustrating a remote controller when the fourth user is identified through the fingerprint recognition according to an exemplary embodiment.

FIG. 6 and FIG. 7 display remote GUIs for the third user and the fourth user, respectively. Referring to FIG. 6, the third user sets the rectangular buttons in the size of 6×5, and referring to FIG. 7, the fourth user sets the rectangular buttons in the size of 7×6. Accordingly, the buttons displayed in the button display area 430 in FIG. 7 are bigger than those in FIG. 6.

In addition, the hot-keys displayed in the hot-key display area 440 in FIG. 6 are different from those in FIG. 7. As such, the remote controller 100 may set different hot-keys according to a user.

Figure 8:
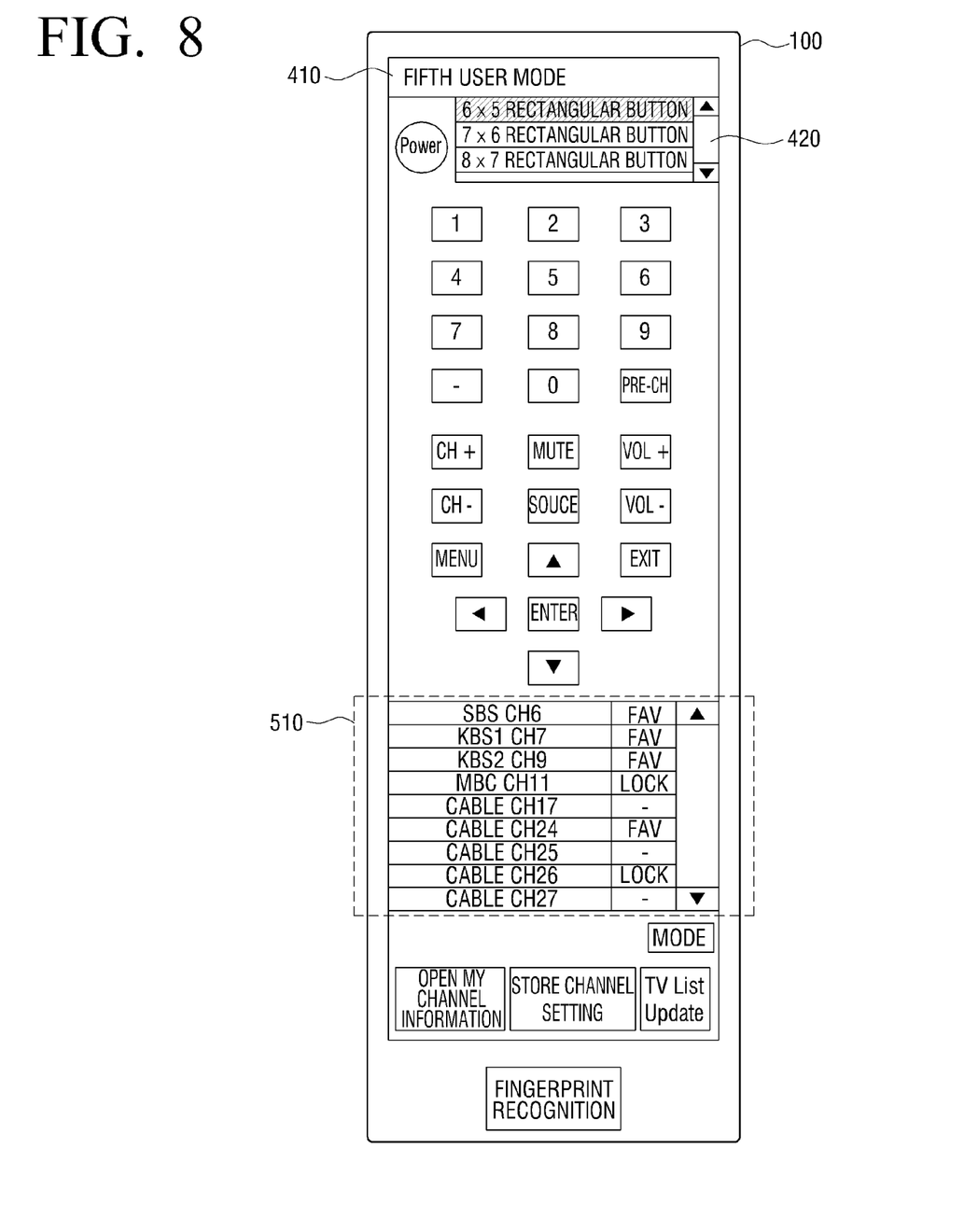
FIG. 8 is a view illustrating a remote controller when a current user is identified as the fifth user through fingerprint recognition according to an exemplary embodiment.

FIG. 8 is a view illustrating a remote controller when the fifth user is identified through the fingerprint recognition according to an exemplary embodiment. The channels and options in the channel list in FIG. 8 are different from those illustrated in FIG. 5. As such, a channel list may be set differently according to a user.

The remote controller 100 may provide different GUIs for performing various functions for each user through the fingerprint recognition. Because the remote controller 100 can identify a user through the fingerprint reading, the user may use the remote controller more easily and intuitively.

According to an exemplary embodiment, a method for setting a remote controller to identify a user through the fingerprint recognition and provide functions corresponding to the identified user, and a remote controller thereof are provided. Therefore, the user may use the functions of the remote controller more easily and intuitively.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for setting a remote controller which controls an electronic device, the method comprising:
   identifying a user by fingerprint recognition; and
   setting the remote controller to provide graphical user interface (GUI) corresponding to the identified user,
   wherein the setting comprises:
      setting the remote controller to display a first GUI corresponding to the identified user on a first area of a screen, and the first GUI comprises a plurality graphic but's which have a size preferred by the identified user, and
      setting the remote controller to display a second GUI corresponding to the identified user in a second area of the screen, simultaneously with the display of the first GUI in the first area, and the second GUI comprises a plurality of graphic buttons which have a type preferred by the identified user and selected from buttons provided in a third GUI in the second area by dragging and dropping,
   wherein functions of the first GUI are fixed to input a user command for controlling an operation of the electronic device and functions of the second GUI are user-specific to input a user command for controlling an operation of the remote controller selected by the user.

2. The method as claimed in claim 1, wherein the setting comprises setting a size of at least one button displayed on a remote controller screen according to the identified user.

3. The method as claimed in claim 1, wherein the setting the remote controller to display the second GUI comprises setting the remote controller to display a hot-key display area for selected buttons to perform the functions corresponding to the identified user on the second area.

4. The method as claimed in claim 3, wherein the selected buttons are selected by the identified user from function buttons to perform the functions provided by the remote controller; and
   a presence of the hot-key display area is configurable on a per-user basis.

5. The method as claimed in claim 1, wherein the setting comprises setting the remote controller to display a broadcast channel list corresponding to the identified user on a remote controller screen.

6. The method as claimed in claim 5, wherein at least one of a preferred channel option and a channel lock option for each channel is selected in the broadcast channel list.

7. The method as claimed in claim 5, further comprising:
   transmitting information regarding a changed configuration of the broadcast channel list to the electronic device when the broadcast channel list is changed.

8. The method as claimed in claim 1, wherein the setting comprises setting the remote controller to divide a screen on the remote controller into a plurality of areas and to display the GUI comprises buttons to input a channel number and commands in the divided areas of the screen on the remote controller.

9. A remote controller to control an electronic device, the remote controller comprising:
   a display unit which displays a graphical user interface (GUI);
   a fingerprint recognition unit which identifies a user by fingerprint recognition; and
   a control unit which provides the GUI corresponding to the identified user,
   wherein the display unit displays a first GUI corresponding to the identified user on a first area of a screen, and the first GUI comprises a plurality of graphic buttons which have a size preferred by the identified user, and the display unit displays a second GUI corresponding to the identified user in a second area of the screen, simultaneously with the display of the first GUI in the first area, and the second GUI comprises a plurality of graphic buttons which have a type preferred by the identified user and selected from buttons provided in a third GUI in the second area by dragging and dropping,
   wherein functions of the first GUI are fixed to input a user command for controlling an operation of the electronic device and functions of the second GUI are user-specific to input a user command for controlling an operation of the remote controller selected by the user.

10. The remote controller as claimed in claim 9, wherein the control unit sets a size of at least one button displayed on a remote controller screen according to the identified user.

11. The remote controller as claimed in claim 9, wherein the control unit sets the display unit to display a hot-key display area for selected buttons to perform the functions corresponding to the identified user on the second area.

12. The remote controller as claimed in claim 11, wherein the selected buttons are selected by the identified user from function buttons to perform the functions provided by the remote controller, and
   a presence of the hot-key display area is configurable on a per-user basis.

13. The remote controller as claimed in claim 9, wherein the control unit sets the display unit to display a broadcast channel list corresponding to the identified user on a screen.

14. The remote controller as claimed in claim 13, wherein the broadcast channel list allows the identified user to select at least one of a preferred channel option and a channel lock option for each channel.

15. The remote controller as claimed in claim 13, wherein the control unit controls the remote controller to transmit, when the broadcast channel list is changed, information regarding the changed configuration of the broadcast channel list to the electronic device.

16. A method comprising:
sensing a fingerprint of a user;
comparing the sensed fingerprint to fingerprints stored in a database;
identifying the user based on the comparing;
retrieving settings of a graphical user interface (GUI) corresponding to the identified user; and
displaying the GUI with the retrieved settings,
wherein the setting comprises:
   setting the remote controller to display a first GUI corresponding to the identified user on a first area of a screen, and the first GUI comprises a plurality of graphic buttons which have a size preferred by the identified user, and
   setting the remote controller to display a second GUI corresponding to the identified user in a second area of the screen, simultaneously with the display of the first GUI in the first area, and the second GUI comprises a plurality of graphic buttons which have a type preferred by the identified user and selected from buttons provided in a third GUI in the second area by user's dragging and dropping,
wherein functions of the first GUI are fixed to input a user command for controlling an operation of the electronic device and functions of the second GUI are user-specific to input a user command for controlling an operation of the remote controller selected by the user.

17. The method as claimed in claim 16, wherein the settings comprise at least one of a size of a button, a function button, and a broadcast channel list to be displayed on the GUI.

18. The method as claimed in claim 16, further comprising:
selecting, by the identified user, selected buttons from function buttons which perform functions of the remote controller; and
setting the remote controller to display a hot-key display area for the selected buttons on the second area.

19. The method as claimed in claim 16, wherein the setting comprises setting the remote controller to display a broadcast channel list corresponding to the identified user on a remote controller screen, comprising displaying at least one of a preferred channel option and a channel lock option for each channel displayed in the broadcast channel list.

* * * * *